(12) United States Patent
Lehr

(10) Patent No.: US 6,202,968 B1
(45) Date of Patent: Mar. 20, 2001

(54) LOCKING GIMBAL RING ASSEMBLY

(75) Inventor: Harold Lehr, Marmaroneck, NY (US)

(73) Assignee: Zumtobel Staff Lighting, Inc., Garfield, NJ (US)

( * ) Notice: Subject to any disclaimer, the term of this patent is extended or adjusted under 35 U.S.C. 154(b) by 0 days.

(21) Appl. No.: 09/373,848

(22) Filed: Aug. 13, 1999

(51) Int. Cl.[7] .......................... E04G 3/00
(52) U.S. Cl. .......................... 248/278
(58) Field of Search .......................... 248/278.1, 487, 248/180.1

(56) References Cited

U.S. PATENT DOCUMENTS

| | | | |
|---|---|---|---|
| 3,861,763 | * 1/1975 | Perkins | 248/183.1 X |
| 4,733,839 | * 3/1988 | Gehris | 248/180.1 |
| 5,353,167 | * 10/1994 | Kuklo et al. | 248/485 X |

* cited by examiner

Primary Examiner—Ramon O. Ramirez
(74) Attorney, Agent, or Firm—Brown & Wood, LLP

(57) ABSTRACT

A locking gimbal ring assembly including an inner ring for holding an article and an outer clamping element for receiving the inner holding ring and connectable with an outside structure, with the outer clamping element being formed of two superimposed annular elements having each a circular half-hole provided on an adjacent end surface of each of the annular element and complementary to each other, the complementary circular half-holes forming a clamping socket, the top and bottom annular elements having at least a pair of complementary opposite holes for connecting the top and bottom annular elements together, the assembly further including a pin connectable with the inner holding ring for joint pivotal movement therewith and receivable in the clamping socket formed by the annular elements, and screws extending into the pair of complementary holes formed in the top and bottom annular elements for adjustably connecting the top and bottom annual elements.

8 Claims, 5 Drawing Sheets

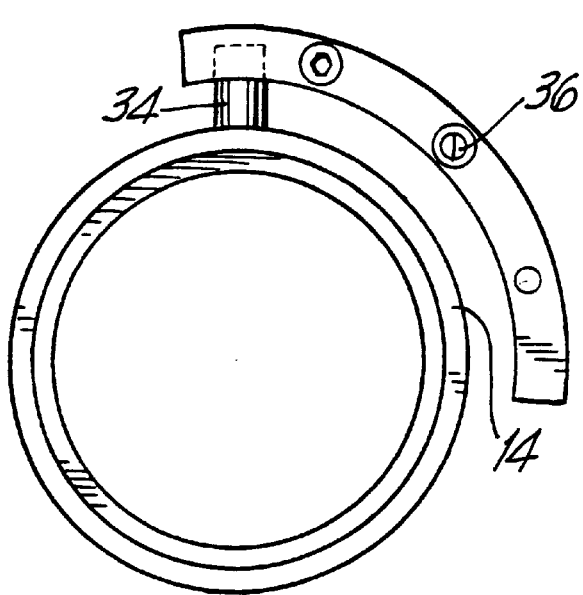 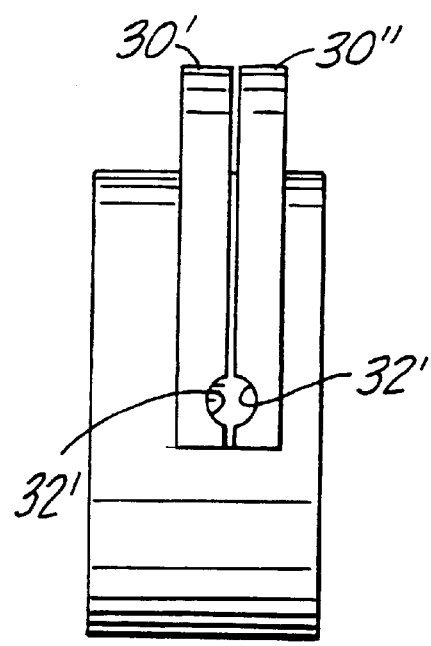
FIG.11  FIG.12
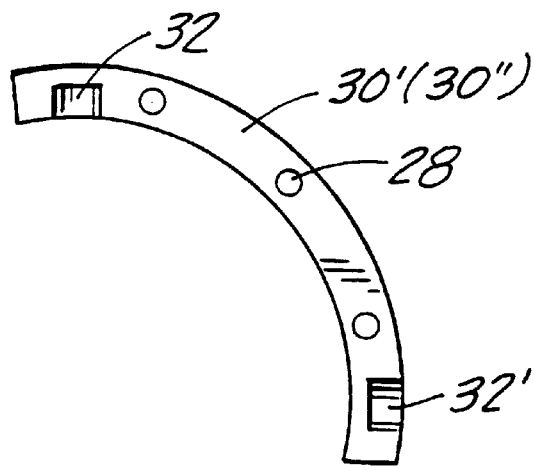 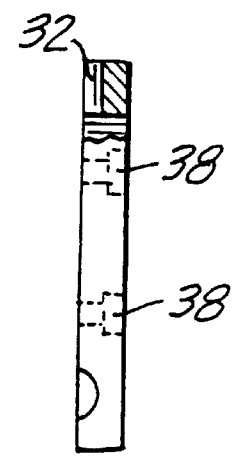
FIG.13  FIG.14

LOCKING GIMBAL RING ASSEMBLY

BACKGROUND OF THE INVENTION

1. Field of the Invention

The present invention relates to a locking gimbal ring assembly including an inner ring for holding an article, an outer clamping element, which can, e.g., be formed as a ring for receiving the inner holding ring and connectable with outside points, and elements for pivotally connecting the inner holding ring with the outer clamping element. The present invention also relates to a ring element forming the outer clamping ring.

2. Description of the Prior Art

Circular gimbal ring assemblies or gimbals are generally used for supporting an article in horizontal, vertical, or arbitrary inclined positions. A conventional gimbal ring assembly includes an inner ring for holding, e.g., a lamp, and an outer clamping ring connected with the inner ring and secured in an outside structure. The inner holding ring is securable in the clamping ring with a possibility of pivotal movement therein and after having been pivoted to a predetermined position, is secured in that position.

A conventional gimbal ring assembly is shown in FIGS. 1–2. It includes a one-piece clamping ring securable to outside points, e.g., with two screws and nuts, with the screws extending through diametrically opposite openings formed in the outer clamping ring. Generally, the inner ring is securable to the outer ring with diametrically opposite threaded pins with nuts or screws. When the position of the inner holding ring need be changed, the nuts or screws are released, and the inner holding ring is pivoted to a desired position. Then, the nuts or screws are tightened again.

The above-described conventional gimbal ring assembly has a number of drawbacks. On many occasions, there is little space between the outer clamping ring and the structure, to which the gimbal ring assembly is attached. Therefore, the nuts or screws, with which the outer clamping ring is attached to the inner holding ring, can be accessed only with much difficulties. Further, an operator needs to use both hands for releasing or tightening the nuts or the screws. Still further, it is practically impossible to retain the inner holding ring in a precisely predetermined position during tightening of the nuts or screws. This is because the tightening torque causes shifting of the inner holding ring.

Accordingly, an object of the present invention is to provide a locking circular gimbal assembly which would insure easy release and tightening of the inner holding ring.

Another object of the present invention is to provide a locking circular gimbal assembly in which the inner holding ring can be precisely secured in its predetermined position.

SUMMARY OF THE INVENTION

These and other objects of the present invention, which will become apparent hereinafter, are achieved by providing a locking gimbal assembly in which the outer clamping element is formed of superimposed top and bottom annular elements having adjacent end surfaces and at least one circular groove provided on each of the adjacent end surfaces of the top and bottom annular elements and complementary to each other. The complementary circular grooves form a clamping socket. The top and bottom annular elements have at least one pair of complementary diametrically opposite holes for connecting the top and bottom annular elements together.

The connecting and securing elements include a pin fixedly connectable with the inner holding ring for joint pivotal movement with the inner ring and receivable in the clamping socket formed by the top and bottom annular elements, and connecting members extending into the complementary holes formed in the top and bottom annular elements for connecting the top and bottom annular elements so that the clamping socket formed by the superimposed top and bottom annular elements applies and adjustable clamping force to the pin.

According to a preferred embodiment of the present invention, the annular elements are formed as ring segments, with the circular grooves, which are provided on the adjacent end surfaces of the top and bottom ring segments being formed as blind half-holes. At that, at least the connecting hole, which is formed in the bottom ring segment, can be formed as a threaded hole, with the two ring segments being connected by a screw.

According to a particularly preferred embodiment of the present invention, the outer clamping element is formed of superimposed top and bottom rings having adjacent end surfaces and two diametrically opposite circular grooves provided on the adjacent end surface of each of the top and bottom rings, and complementary with the diametrically opposite circular grooves provided on the adjacent end surface of another of the top and bottom rings. The complementary diametrically opposite circular grooves form two clamping sockets. The top and bottom rings have at least two pairs of complementary diametrically opposite holes for connecting the top and bottom rings together and which are formed in walls of the top and bottom rings. At least the holes formed in the bottom ring are formed as threaded holes.

The connecting and securing elements include pins fixedly connectable with the inner holding ring at diametrically opposite points thereof for joint pivotal movement with the inner ring and receivable in the clamping sockets formed by the top and bottom rings, and screws extending into respective pairs of complementary through-holes formed in side walls of the top and bottom rings for connecting the top and bottom rings so that the clamping sockets formed by the superimposed top and bottom rings apply and adjustable clamping force to the pins.

According to a still further preferred embodiment of the present invention, two additional clamping sockets are formed by the top and bottom rings. The additional clamping sockets serve for receiving pins which are fixed to the outside points and which connect the gimbal ring assembly to the outside structure. Generally, the additional clamping sockets are spaced from the clamping sockets which receive the pins connecting the outer clamping ring with the inner holding ring, by an angle of 90°.

Further, while two pairs of complimentary holes suffice for an adequate connection of the top and bottom rings, advantageously four pairs of such holes are used, with the holes of the second pair being spaced from the holes of the first pair approximately by 90°.

Generally, the arc of the circular grooves, which form the clamping sockets is smaller than a semicircle, so that a clearance is provided between the top and bottom rings in the assembled condition of the locking gimbal ring assembly. Thereby, it is insured that a clamping force is applied to the pins in a fully clamped condition of the sockets.

The novel features of the present invention, which are considered as characteristic for the invention, are set forth in particular in the appended claims. The invention itself, however, both as to its construction and its mode of operation, together with additional advantages and objects thereof, will be best understood from the following detailed description of preferred embodiments when read with reference to the accompanying drawings.

BRIEF DESCRIPTION OF THE DRAWINGS

FIG. 11 shows a plan view of a locking gimbal ring assembly shown in FIG. 9;

FIG. 12 shows a side view of a locking gimbal ring assembly shown in FIG. 9;

FIG. 13 shows a plan view of a ring segment used as top or bottom ring segment; and FIG. 14 shows a side view of the ring segment shown in FIG. 13.

DETAILED DESCRIPTION OF THE PREFERRED EMBODIMENT

Figure 1:
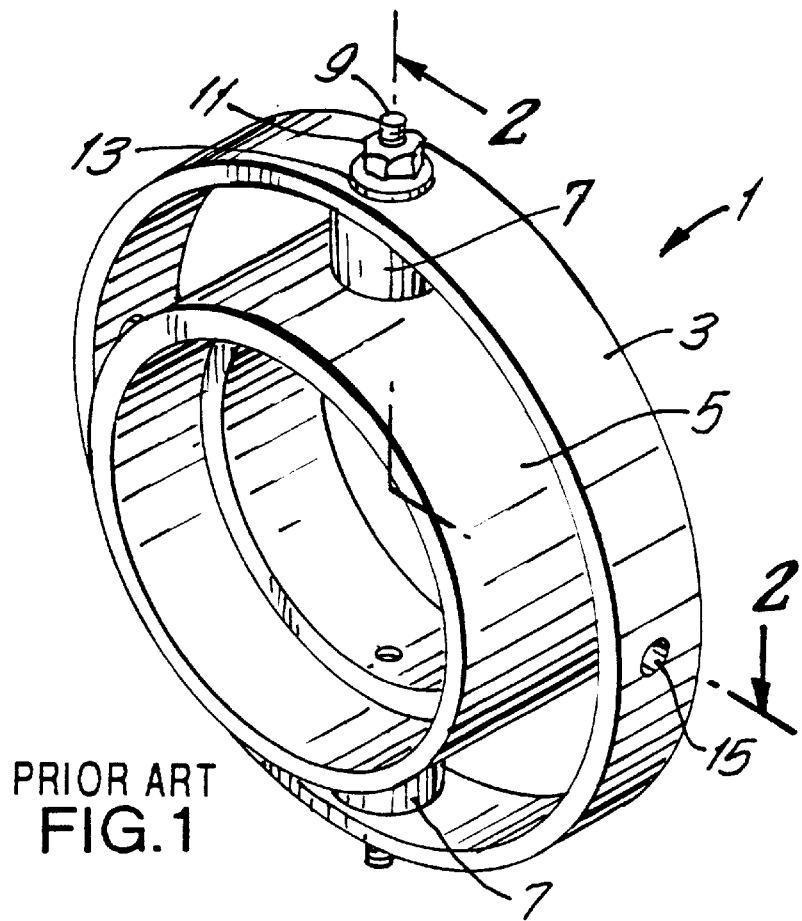
FIG. 1 shows a perspective view of a locking gimbal rings assembly of the prior art.
Figure 2:
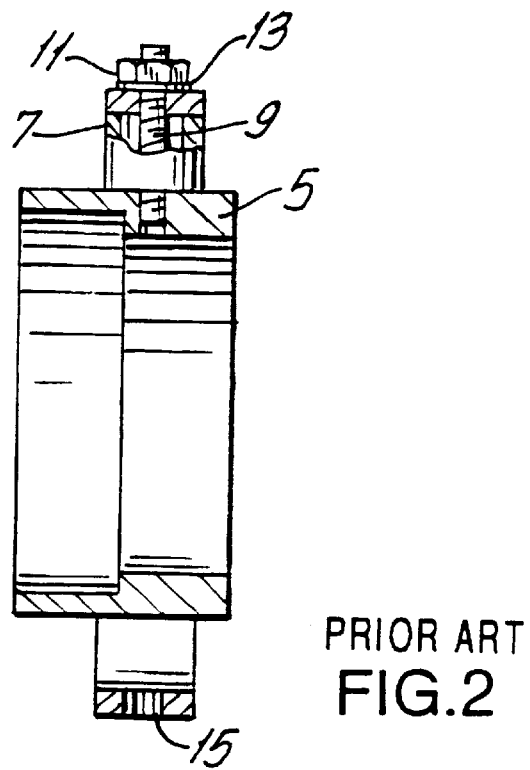
FIG. 2 shows a cross-sectional view along line 2—2 in FIG. 1.
Figure 3:
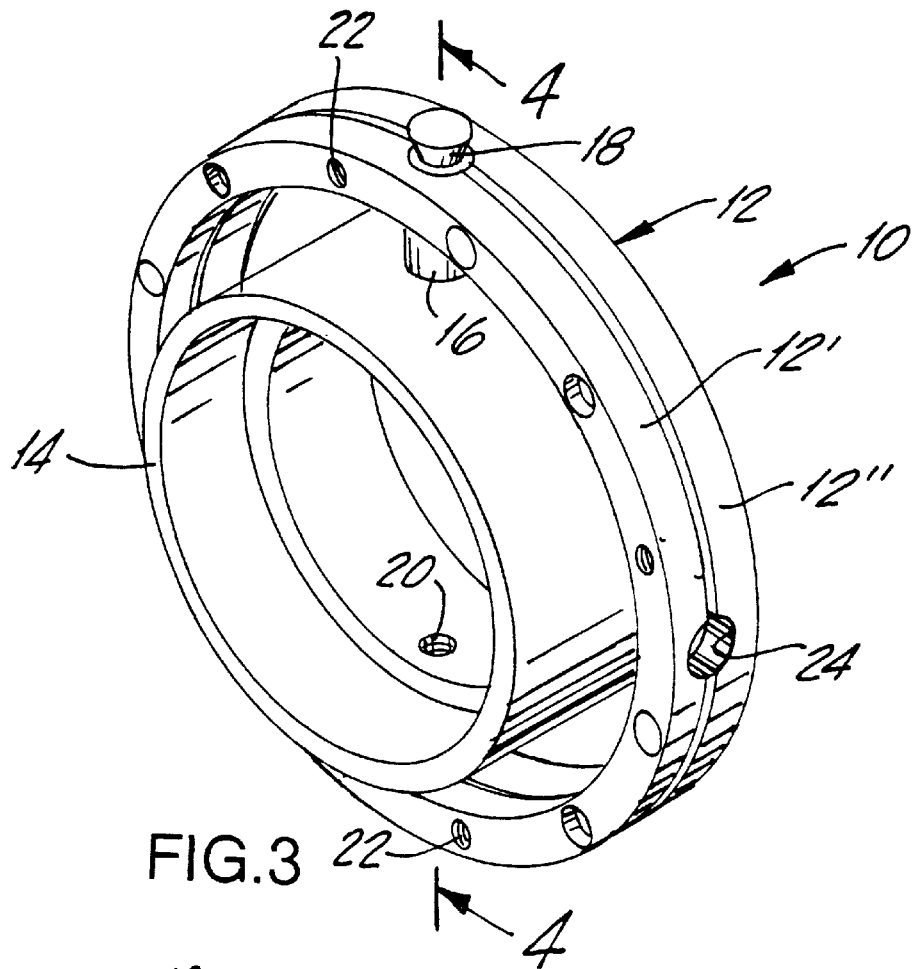
FIG. 3 shows a perspective view of a locking gimbal ring assembly accordingly to the present invention.
Figure 4:
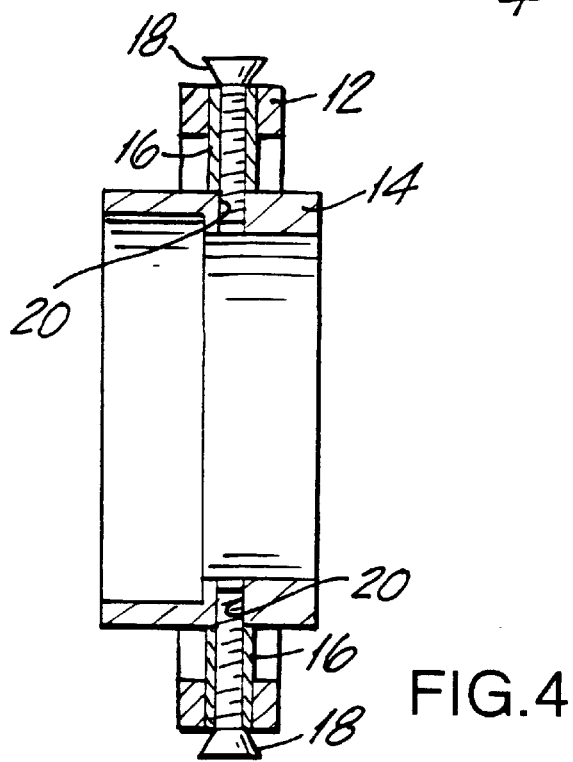
FIG. 4 shows a cross-section view along line 4—4 in FIG. 3.

FIGS. 1–2 show a conventional locking gimbal ring assembly 1. The gimbal ring assembly includes an outer clamping ring 3 and an inner holding ring 5, e.g., for holding a lamp. The outer clamping right 3 and the inner holding ring 5 are connected with two threaded studs 9, which extend through complementary holes formed in the outer and inner rings 3 and 5, of which the hole formed in the inner ring 5 is a threaded hole, and nuts 11 which are supported on washers 13. The outer clamping ring 3 and the inner holding ring 5 are separated by spacer sleeves 7 through which the threaded studs 9 extend. The locking gimbal ring assembly 1 can be secured to an outside structures by pins, screws and the like extendable through two diametrically opposite openings 15 (only one opening 15 is shown in FIGS. 1 and 2).

As it should be clear from the foregoing description, the connection of the gimbal ring assembly 1 to the outside structure is rather cumbersome as a precise alignment of the connecting pins with the openings 15 is required. Further, the adjusting of the clamping force applied to the inner holding ring is likewise rather cumbersome. To this end, the nuts 11, only one nut 11 is visible in the drawings, need be released. The nuts 11 are not always easily accessible. Further, an operator need to use both hands, holding a tool in one hand and the inner ring 5 by the other hand.

The drawbacks of the locking gimbal ring assembly 1 are eliminated in a locking gimbal ring assembly 10 according to the present invention and which is shown in FIGS. 3–6, which show a preferred embodiment of the present invention. The inner holding right 14 of the gimbal ring assembly 10 is substantially similar to the inner holding ring 5 of the prior art gimbal ring assembly 1. However, the outer clamping ring 12 is completely different. It is formed of two superimposed rings, top ring 12' and a bottom ring 12". It should be understood the terms "top" and "bottom" are arbitrary terms. Instead, e.g., terms "front" and "rear" can be used. Each of the rings 12 has diametrically opposite circular half-holes 28 (see FIGS. 7–8) which in an assembly condition of the outer clamping ring form clamping sockets in which pins 16, which connect the outer clamping ring 12 with the inner holding ring 14, are received. The pins 16 are fixedly connected with inner holding ring 14, e.g., by screws 18 which are screwed into threaded openings 20 formed in the circumferential wall of the inner holding ring 14. Of course, other connection means can be used. The two rings 12' and 12" have additional complementary half-holes 24 which form together additional clamping sockets in which pins (not shown), which connect the gimbal ring assembly 10 with an outside structure are received.

Figure 5:
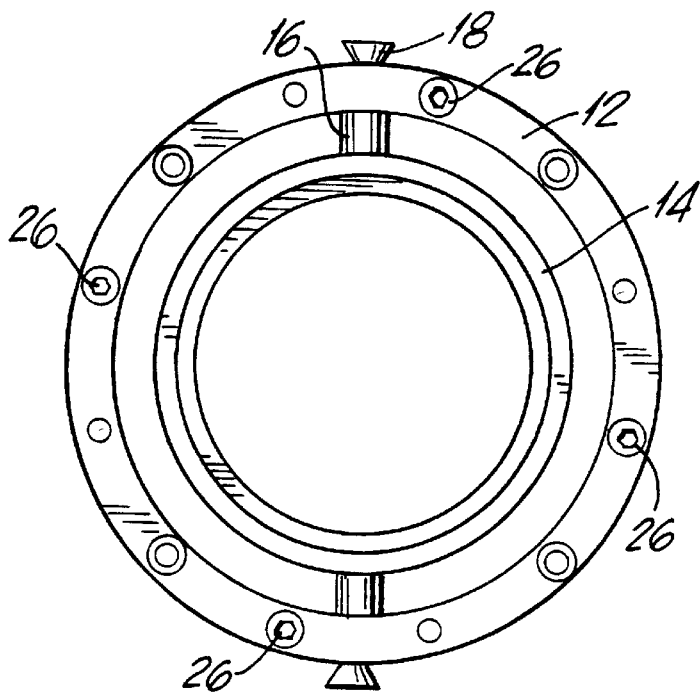
FIG. 5 shows a plan view of a locking gimbal ring assembly according to the present invention.
Figure 6:
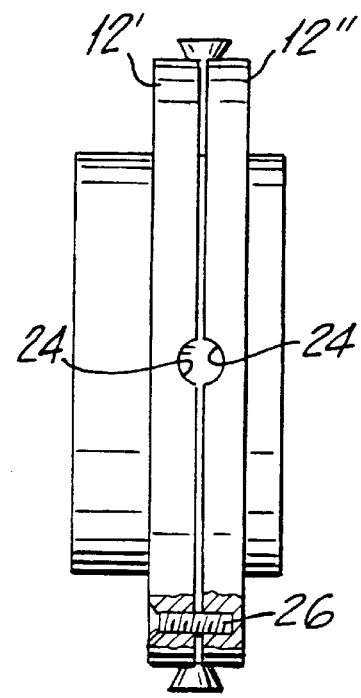
FIG. 6 shows a side view of a locking gimbal ring assembly according to the present invention.

The top and bottom rings may be connected by screws 26 (see FIG. 6) which extend through pairs of diametrically opposite holes 22 formed in the walls of the rings 12' and 12". While generally only two pairs are sufficient for connecting the rings 12' and 12", preferably, four such pairs are used, as shown in FIG. 5. It should be understood that other connection means can be used.

E.g., the top and bottom rings 12' and 12" can be connected by a bolt and nut, etc . . . .

The outer clamping right 12 applies an adjustable clamping force to the pins 16. When the rings 12' and 12" are loosely clamped, the pins 16, together with the inner holding ring 14 can freely pivot in the clamping sockets formed by the complementary half-holes 28 of the rings 12' and 12". While the half-holes 28 are shown as through holes, it should be understood that they could be formed as a blind half-holes. When the pins 16 are completely clamped, by tightening of the screws 26, they cannot rotate, and the position of inner ring 14 is fixed. Likewise, the position of the outer clamping ring 12 with respect to the outside points becomes fixed, by clamping of the connecting pins receivable in the additional sockets 24.

Figure 7:
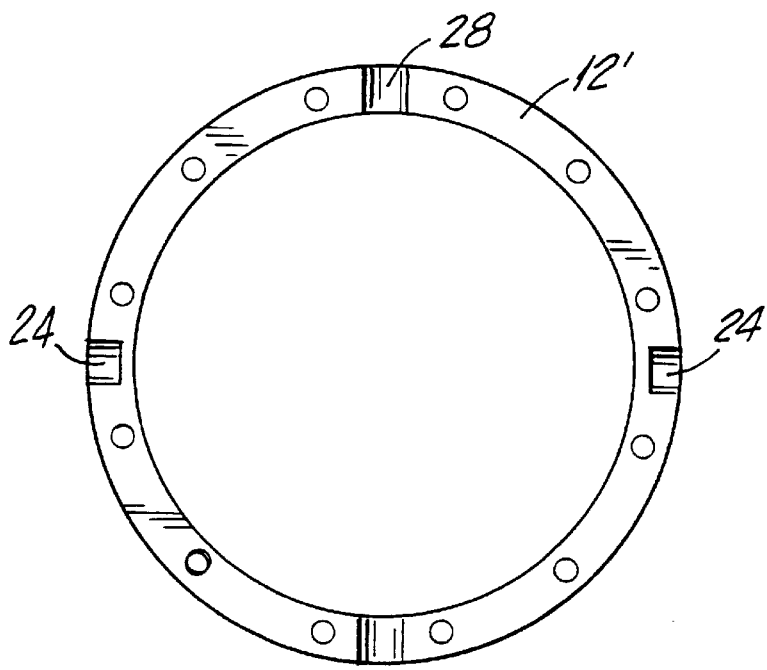
FIG. 7 shows a plan view of a ring used as a top or bottom rings.
Figure 8:
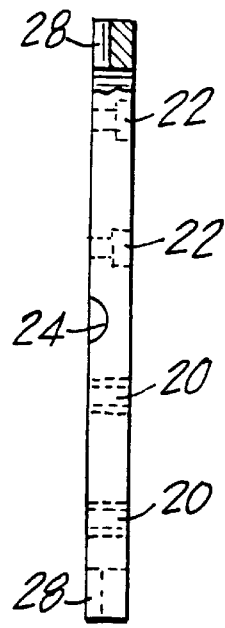
FIG. 8 shows a side view of the ring shown in FIG. 7.
Figure 9:
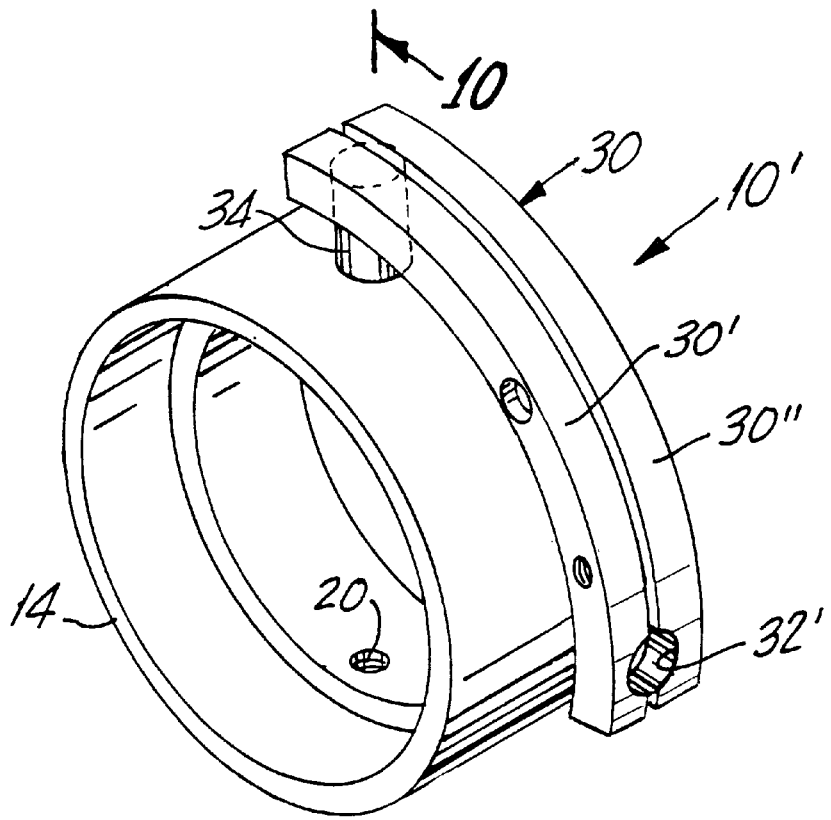
FIG. 9 shows a perspective view of a locking gimbal ring assembly according to another embodiment the present invention.
Figure 10:
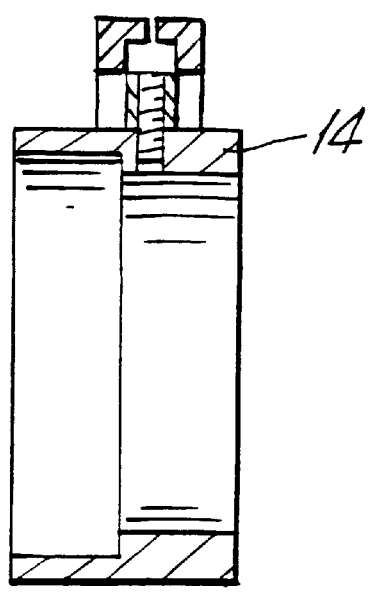
FIG. 10 shows a cross-sectional view along line 10—10 in FIG. 9.

The ring 12', 12" is shown in FIGS. 7–8. It can be used both as a top ring and as a bottom ring.

Another embodiment of the present invention is shown in FIGS. 9–12. As it is apparent from FIGS. 9–12, the outer clamping element need not necessarily be formed as a ring member. The outer clamping element can be formed as a ring segment element 30 formed of two superimposed top and bottom ring segment 30' and 30". Each of the rings 30' and 30" has diametrically opposite circular grooves or half-holes 32, which can be made as blind half-holes in case the pin 34 is fixedly connected with the inner ring 14 (see FIGS. 13–14) which in an assembled condition of the outer clamping ring segment form form a clamping socket. The two ring segments 30' and 30" have additional complementary circular half-holes 32' which form together an additional clamping socket in which a pin (not shown), which connects the gimbal ring assembly 10' with an outside structure is received.

The top and bottom ring segments 30' and 30" are connected by a screw 36 which extend through a pair of holes 38 formed in the walls of the ring segments 30' and 30".

The outer clamping ring segment 30 applies an adjustable clamping force to the pin 34 and to the pin (not shown) held in clamping socket 32' and 32". A ring segment, which is used for forming the top ring segment 30' and the bottom ring segment 30" is shown in FIGS. 13–14.

One of the advantages of the present invention, in particular of the embodiment shown in FIGS. 3–6, consists in that it permits to form the inner holding ring 14 of two ring halves, with the pins 16 being formed integrally with respective ring halves. At that, no additional means for connection of the two ring halves is needed because the ring halves, which form the inner holding ring, all held together by the means which connects the clamping outer ring with the inner holding ring. It should be clear that the outer clamping element need not be formed as a full ring. It can also be formed as a ring segment, e.g., of about 200°.

Though the present invention has been shown and described with reference to a preferred embodiment, such is merely illustrative of the present invention and is not to be construed as a limitation thereof, and the present invention includes all modifications, variations and/or alternate embodiments within the spirit and scope of the present invention as defined by the appended claims.

What is claimed is:

1. A locking gimbal assembly comprising:

an inner ring for holding an article:

outer clamping means for receiving the inner holding ring and connectable with outside means; and means for pivotally connecting the inner holding ring with the outer clamping means and for fixedly securing the inner holding ring within the outer clamping means, wherein the outer clamping means in formed of superimposed top and bottom annular elements having at least one circular half-hole provided on each of the adjacent end surfaces of the top and bottom rings, and complementary to each other, the complementary circular grooves forming a clamping socket, the top and bottom annular elements having at least one pair of complementary opposite holes for connecting the top and bottom annular elements together, and wherein the connecting and securing means comprises a pin fixedly connectable with the inner holding ring for joint pivotal movement therewith and receivable in at least one clamping socket formed by the top and bottom annular elements, and screws extending into the holes of at least one pair of complementary opposite holes for connecting the top and bottom annular elements to provide for application of an adjustable clamping force to the pins by the clamping socket formed by the superimposed top and bottom annular elements.

2. A locking gimbal ring assembly as set forth in claim 1, wherein the top and bottom annular elements are formed as ring segments.

3. A locking gimbal ring assembly comprising:

an inner ring for holding an article;

outer clamping ring means for receiving the inner holding ring and connectable with outside means; and means for pivotally connecting the inner holding ring with the outer clamping ring means and for fixedly securing the inner holding ring within the outer clamping ring means, wherein the outer clamping ring means is formed of superimposed top and bottom rings having adjacent end surfaces and two diametrically opposite circular grooves provided on the adjacent end surface of each of the top and bottom rings and complementary with the diametrically opposite circular grooves provided on the adjacent end surface of another of the top and bottom rings, the complementary diametrically opposite circular grooves forming two clamping sockets, the top and bottom rings having at least two pairs of complementary diametrically opposite holes for connecting the top and bottom rings together and formed in side walls of the top and bottom rings, with at least the holes formed in the bottom ring being formed as threaded holes, and wherein the connecting and securing means comprises pins fixedly connectable with the inner holding ring at diametrically opposite points thereof for joint pivotal movement therewith and receivable in the clamping sockets formed by the top and bottom rings, and screws extending into respective pairs of diametrically opposite complementary holes formed in the side walls of the top and bottom rings for connecting the top and bottom rings to provide for application of an adjustable clamping force to the pins by the clamping sockets formed by the superimposed top and bottom rings.

4. A locking gimbal ring assembly as set forth in claim 3, wherein the top and bottom ring form two additional diametrically opposite clamping sockets for receiving pins connecting the locking gimbal ring assembly with an outside structure.

5. A locking gimbal ring assembly as set forth in claim 4, wherein each of the two additional clamping sockets is spaced from the clamping sockets, which receive the pins connecting the top and bottom rings, by an angle of about 90°.

6. A locking gimbal ring assembly as set forth in claim 4, wherein an arc of each circular groove, which form a part of a respective clamping socket, is smaller than a semicircle, whereby a tensioning force is applied to respective pins.

7. A locking gimbal ring assembly as set forth in claim 3, wherein the diametrically opposite complementary holes are space from respective clamping sockets by an angle less than 90°.

8. A locking gimbal ring assembly as set forth in claim 3, wherein the pins connecting the top and bottom rings are formed as hollow pins and are connected to the inner holding ring by screws.

* * * * *